April 28, 1925. 1,536,037

W. K. BISHOP

LIGHT FOR VEHICLE CURTAINS

Filed Oct. 15, 1923

WITNESSES.

WILLIAM K. BISHOP INVENTOR.

BY

ATTORNEY.

Patented Apr. 28, 1925.

1,536,037

UNITED STATES PATENT OFFICE.

WILLIAM K. BISHOP, OF BINGHAMTON, NEW YORK, ASSIGNOR TO THE BREWER-TITCHENER CORPORATION, OF CORTLAND, NEW YORK, A CORPORATION OF NEW YORK.

LIGHT FOR VEHICLE CURTAINS.

Application filed October 15, 1923. Serial No. 668,530.

*To all whom it may concern:*

Be it known that I, WILLIAM K. BISHOP, a citizen of the United States, and a resident of Binghamton, in the county of Broome and the State of New York, have invented certain new and useful Improvements in Lights for Vehicle Curtains, of which the following is a specification.

My invention relates to a window frame and more particularly pertains to a window or light adapted to be formed through an opening in the curtain of an automobile or other vehicle.

The object of this invention is to reduce the cost of installation and simplify the sheet metal frame structure which mounts the window pane and makes a tight joint with the curtain fabric. An improved two part frame is used for this purpose comprising a finishing or outer member and a complementary back or inner frame. Simple and novel fastening means are provided for binding the marginal edges of the fabric opening between the two frame parts in such fashion that the structure as a whole may be interlocked without resorting to separate fastening devices or prongs of any kind.

This end is accomplished by the use of an outer frame member having a bowed or dished cross-sectional shape with an internal flat flange that circumscribes and bears against the marginal edges of the transparent pane. The dished portion of the frame is further provided with a set of spaced overhung lugs that project inwardly from the respective longitudinal edges of said dished contour and constitute an undercut annular slot therebetween.

The separate backing or inner frame is provided with a similarly disposed internal flat flange that bears against the opposite side of the pane. Formed integral with and around this internal flange, is an offset grooved rectangular bead-like male part that freely projects into and registers with the annular slot, or female part, formed in the outer frame member. The curtain fabric is then clamped between these nested male and female parts and is securely gripped thereby, while the margin of the pane is held and centered between the surrounding internal flanges of the respective frame members.

When the two frame members are firmly pressed together, the walls defining the groove in the rearward side of the male part of the backing frame member will be exposed to view. This prerequisite is taken advantage of in fastening the frame parts together by means of a novel crimp or indented cleat formed integral with the side walls of said rectangular male offset. A cleat is formed by either crimping, indenting, or expanding the relatively thin side walls of said male part outwardly so as to grip in under the respective adjacent overhung lugs of the nested female part. A plurality of such cleats are suitably spaced and serve to interlock the inner frame part with the outer frame part after these members and the curtain fabric have been properly assembled in place.

The described frame structure not only securely holds the pane but at the same time makes a tight joint with respect to the curtain fabric. The indented method of interlocking the frame parts insures of a satisfactory tie to the curtain even when a fabric of fragile texture is used. The improved fastening device eliminates the need for separate screws, prongs or the like, and thus effects a substantial saving in the manufacturing cost of curtain light frames. The expense required to trim and mount this improved type of light on a productive scale is also reduced to a minimum.

The sharp offset given to the interwoven fabric when clamped between the male and female frame parts, serves to make a tight binding and enables the fabric to support a heavy pane without tearing out at the marginal edges at the fabric opening. The two frame members are entirely free from projecting parts of any kind and when assembled in place, present a neatly finished appearance on either side of the frame.

Embodied herein are also other features of structure and organization designed to facilitate the manufacture and application of said curtain frame, all of which will be set forth in detail hereinafter, and certain of which features have been more particularly set forth in my co-pending application Serial No. 730,842 filed August 8, 1924.

Reference is had to the accompanying one sheet drawing which illustrates an example of the preferred form of my invention; like characters of reference indicate like parts in the several views, and in which drawing.

Figure 9:
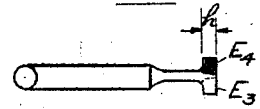
Figure 10:
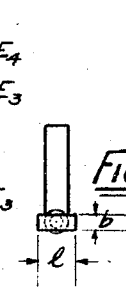
Figure 8:
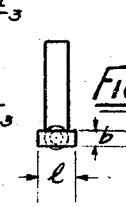
Fig. 8, represents a crimping tool suitable for forming the locking cleat in the offset side walls of the male part of the inner frame member.

Figs. 9, and 10, represent top and side views, respectively of the tool shown in Fig. 8.

Figure 1:
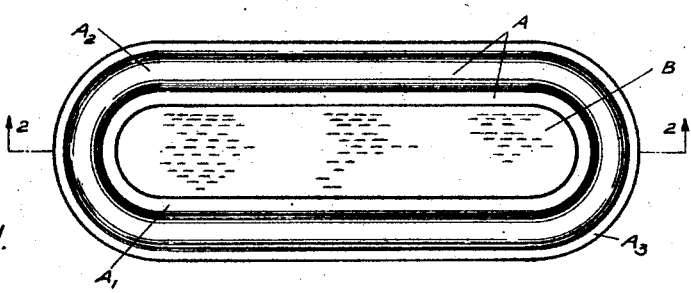
Fig. 1, is an elevational front view showing the outer frame members with the pane mounted therein.
Figure 4:
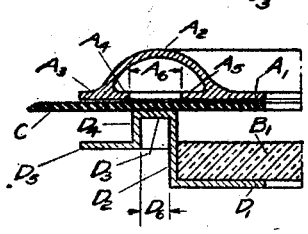
Fig. 4, is an enlarged sectional view indicating the relative position of the various elements prior to pressing the frame members together.

Referring first to Fig. 1, the letter A represents the sheet metal outer frame member in its entirety and B is the transparent pane mounted therein. The frame A is provided with an internal flange $A_1$ that bears against the marginal portion of the pane B. Formed integral with and around said flange is a cross-sectionally dished or bowed part $A_2$, the outermost end of which terminates in a foot flange $A_3$, as is best shown in Fig. 4. The foot $A_3$ is further provided with an inwardly disposed annular lug $A_4$ that overhangs and follows along the outer edge of the dished part $A_2$. The opposite edge of the dished part $A_2$ is likewise provided with a similar annular lug $A_5$, which is spaced from the opposite lug $A_4$ to form the slot or female part, designated as $A_6$. This slot is disposed about the pane and preferably follows the frame contour. It will be seen that the parts $A_3$, $A_4$ and $A_5$ are disposed in a common plane with the face of the internal flange $A_1$ and this plane defines the parting surface of the two part frames as is clearly indicated in Fig. 4.

Figure 2:
Fig. 2, is a detailed view in section of the assembled frame and curtain as taken along the line 2—2 of Fig. 1.
Figure 3:
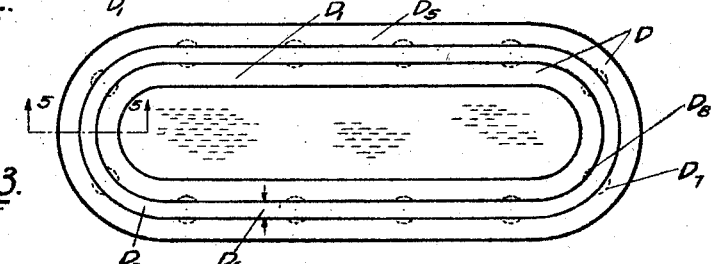
Fig. 3, is a rear view of Fig. 1, showing the inner frame member.

In assembling the frame, the curtain fabric C is intended to initially lie on these aligned parting faces. The pane B is then mounted against internal flange $A_1$ of the inner frame and cushioned by means of the interposed fabric C as shown in Fig. 2. The opposite face of the marginal edge of the pane B is held in place by the internal flange $D_1$ formed integral with the inner or backing frame. This second member of the two part frame is designated as a whole by the letter D.

The outermost edge of the endless internal flange $D_1$ is bent into the annular side wall $D_2$ which is disposed substantially normal to the plane of the flange face $D_1$ and loosely encircles and centers the pane B. The transverse wall $D_2$ is made of sufficient length to project considerably beyond the thickness of the pane B, whereupon the sheet metal of the backing frame is again bent outward and away from the internal flange $D_1$ to form a bottom wall $D_3$. The face dimension of the bottom wall is determined by the width of the receiving slot as will appear hereinafter. The sheet metal is then again bent back to form another annular side wall $D_4$ which is substantially parallel with the side wall $D_2$. The wall $D_4$ is preferably made shorter than the wall $D_2$ and the inner frame member is finally flared outward and away from the wall $D_4$ to form the circumscribing flange $D_5$. This last named flange is disposed in an offset or intermediate relation with respect to the plane of the flat wall $D_3$ and the internal flange $D_1$ so as to align and become flush with the top face of the pane B as shown.

The transverse side walls $D_2$ and $D_4$ together with the internal bottom wall $D_3$ enclose an annular groove of substantially uniform width in the inner frame D, which groove, designated as $D_6$ is disposed around the contour of the pane B. The exterior faces of the spaced side walls $D_2$ and $D_4$ register with and are intended to enter freely into the corresponding undercut slot $A_6$ of the outer frame member A.

The concentric side walls $D_2$ and $D_4$ together with the integral bottom wall $D_3$ constitute the male part of the inner frame member D.

Figure 5:
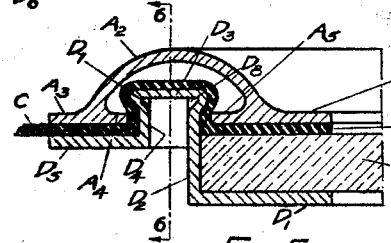
Fig. 5, is an enlarged sectional view of the assembled two part frame as taken along line 5—5 of Fig. 3.

Prior to assembling, the respective frame members assume the relations indicated in Fig. 4. The pane B is centered in the inner frame member D while the fabric C lies between the inner and outer frame flanges as shown. The members A and D are then sprung tightly together causing the fabric C to take a circuitous path about the nested male and female frame parts as shown in Fig. 5. It will be apparent that both frame members possess a certain resiliency and that this is instrumental in causing the pane B to be firmly gripped between the respective internal flanges $A_1$ and $D_1$.

While in this strained or sprung relation, the described male and female flange parts are locked together in a novel manner. For this purpose, the crimping tool shown in its various views by Figs. 8, 9 and 10, may be used. This tool has a shank $E_1$ provided with reduced neck portion $E_2$. The free end of the neck is equipped with a head having two oppositely disposed beveled toes $E_3$ and $E_4$, respectively. As shown in Fig. 10, the overall length $l$ of the oblong head is somewhat greater than is its width dimension $b$. The height $h$, on the other hand, is made somewhat shorter than the distance between the assembled bottom wall $D_3$ of the male part and the overhung lugs $A_4$ or $A_5$, which define the slot in the female part.

Figure 6:
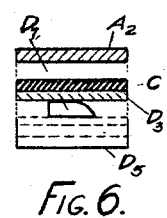
Fig. 6, is a sectional view showing a detail of the crimp cleat as taken along line 6—6 of Fig. 5.

The width $b$ of the tool head is intended to fit within the groove dimension $D_6$. Hence when this tool is firmly pressed against the bottom wall $D_3$ of the exposed groove, the turning of the shank will wedge the beveled toes $E_3$ and $E_4$ into the respective side walls $D_2$ and $D_4$ to cause the sheet metal therein either to expand or to cut a notched wing-like spur through both of said side walls, and simultaneously shape up the opposite crimp or indented cleat means $D_7$ and $D_8$ in the manner indicated in Fig. 5. Fig. 6 is intended to show the lengthwise shape of an expanded cleat as formed in the side wall $D_7$. These expanded projections sunk into the side walls $D_2$ and $D_4$ serve to interlock the outer frame A with the inner frame B after the parts have been properly assembled in place.

It will be observed that each of the indented cleats project outward from their respective side walls $D_2$ and $D_4$ in such fashion that their overall width is now greater than the slot width $D_6$ and they are thereby made to engage the respective overhung lugs $A_5$ and $A_4$, and become positively interlocked therewith. It is further pointed out that when the head length $l$ of my crimping tool is made a little longer than the groove width $D_6$, the described partial turning of the tool handle will serve to expand said indented cleats without necessarily cutting through the side walls $D_2$ and $D_4$. On the other hand, if it is preferred to work with a relatively long head length $l$, this may then be made to cut through said walls and form up triangular ear-like projecting spurs, which become interlocked with the respective overhung lugs $A_4$ and $A_5$ of the female part. The terms "indented", "indented cleat", "expanded", "expansion or indenture", and similar expressions in the claims are used in their generic sense and are intended to cover either or both of these alternative methods of forming the cleat as well as all other types of cleat that may be formed up by any kind of crimping tool adapted to be inserted into the exposed groove $D_6$.

As stated the curtain fabric C is made to conform to the offset nested relation of the male and female parts and the crimping operation presses into the fabric and this interlaces and securely fastens same to the frame members. It will be understood that the dished or bowed portion $A_2$ of the outer frame is to be made sufficiently deep to freely clear that portion of the fabric C which is stretched over the projecting bottom wall $D_3$. Such clearance allows the aligned flanges $A_1$ and $A_3$ of the outer frame member to press snugly against the fabric that is interwoven between the pane B and the circumscribing flange $D_5$ of the inner frame member D.

The described crimping operation provides for spaced indented projections that interlock with the respective frame members after the assembled male part is properly nested within the female part. It is not essential, however, to have the male part interlock with both of the lugs $A_4$ and $A_5$ since the two part frame may also be fastened together by engaging with but one or the other of such lugs.

Furthermore, it will be apparent that by the use of a suitable machine, it would readily be possible to crimp a series of such cleats simultaneously in one operation. If preferred, this type of crimp cleat may be run together so as to constitute a continuous cleat or expanded groove for gripping the respective overhung lug parts. In either case, the curtain C is thereby firmly gripped between the nested male and female parts and this prevents tearing the curtain fabric out of the frame when carrying the relatively heavy pane B. The improved method for interposing curtain fabrics of fragile texture between the indented male and female members of my metal frame, constitutes an important feature of the present invention.

Figure 7:
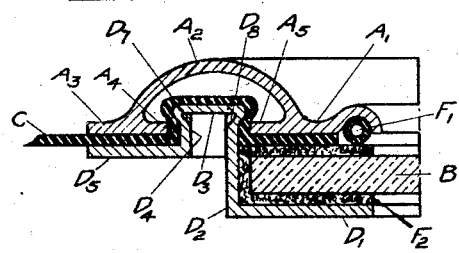
Fig. 7, shows a modification of Fig. 5 in that the outer frame member is provided with elastic packing which bears against the pane and makes a water tight joint therewith.

It is preferred to extend the curtain fabric under the internal flange $A_1$ as shown in Fig. 5. This cushions the mounting of the pane and serves to make a tight joint with respect to the frame member. Fig. 7, shows a modified seat wherein a rubber or other elastic tube $F_1$ is employed to reinforce the seat between the pane and the beaded internal flange $A_1$ and to impart increased resiliency between the internally disposed flanges $A_1$ and $D_1$. This end may also be facilitated by the use of a rubber or felt sheath $F_2$ that is made to surround the marginal edge of the pane B. In other respects the construction is identical with that described in connection with Fig. 5.

In the application of the frame device to a window curtain, the fabric sheet C is cut to provide an opening of about the same dimension as the inside contour of the frame members. With the fabric and pane placed as indicated in Fig. 4, the frame parts are then firmly pressed together and interlocked in the manner described. It will be seen that this operation is extremely simple and easily performed and that the frame members may thereby be securely fastened into the curtain fabric. It will be apparent that the internal flange $D_1$ bearing against the rear of the pane B need not conform in shape to the complementary flange $A_1$ and may be dispensed with when equivalent means carried by the backing frame D are made to serve the same purpose.

Instead of forming a continuous open slot $A_6$ between the outer frame lugs $A_4$ and $A_5$, the same results in the use of the crimp fastening means can be secured by means of a series of spaced shorter slots, or female parts, suitably disposed about the contour of the pane B. In that event, the male parts would preferably be correspondingly shortened so as to again register with such modified slots. It will also be understood that the male part need not necessarily be formed endless or in the described rectangular fashion shown in the drawings, and that various other changes in the details of my device may be resorted to without departing from the spirit and scope of my invention, heretofore described and more particularly set forth in the appended claims.

Claims:

1. In a curtain light frame comprising members adapted to be nested, a male part for one of the members and a registering female part for the other member, and indented cleat means for interlocking the nested male and female parts.

2. In a curtain light frame comprising members adapted to be nested, a male part for one of the members and a registering female part for the other member, an internal flange for each of said frame members, a pane mounted between said flanges, and indented cleat means for the frame members serving to fasten said flanges about the pane.

3. In a curtain light, an outer frame having an annular slot or female part disposed around the pane, an inner frame having an offset grooved male part that registers with and is received by said slot or female part, a pane mounted between said frames, and an indented cleat means interlocking the male and female parts and serving to fasten said frames about said pane.

4. In a curtain light frame comprising one member having a female part and another member having a registering male part adapted to nest within said female part, a curtain interposed between the nested male and female parts of said frame, and indented cleat means serving to interlock the curtain with said frame members.

5. In a curtain light frame, a cross sectionally dished-shape outer frame having inwardly disposed lugs to form a slot therebetween, an inner frame having a registering male part adapted to nest within said slot, an internal flange for each of the respective frames, a pane mounted between said flanges, and indented cleats between the male part and the female part serving to interlock said internal flanges about the pane.

6. In a curtain light, a pane, a dished-shape outer frame having inwardly disposed lugs to form a slot therebetween, an inner frame having a registering male part adapted to nest within said slot, an internal flange for each of the respective frames mounted upon opposite sides of the pane, a curtain mounted between the pane and one of said frames, and indented cleat means interlocking the male part with one or both of said lugs.

7. In a curtain light, a pane, a frame member having an internal flange bearing upon one side of the marginal portion of the pane and a foot flange spaced from said internal flange to form a slot therebetween, a second frame member also having an internal flange bearing upon the opposite side of said pane, a registering integral male part for the second member adapted to nest within said slot, and indented cleat means interlocking the male and female parts of said members.

8. In a curtain light frame, a pane, a member comprising an internal flange bearing upon one face of the marginal portion of the pane, a female part for said member, a second member comprising an internal flange bearing upon the opposite face of the pane, a registering male part for the second member adapted to nest within said female part, resilient sealing means between one of said internal flanges and the pane, and indented cleat means for interlocking said members and holding said sealing means against the pane in a sprung relation.

9. In a sheet metal curtain light frame, a pane, a member comprising an internal flange bearing upon one face of the marginal portion of the pane, a female part for said member, a second member having an internal flange bearing upon the opposite face of said pane, a bead-like male part for said second member projecting into said female part, said male part constituting a groove or recess with respect to the exposed free side of the second member, and indented cleat means interlocking said frame members.

10. In a curtain light comprising a set of complementary endless frame members adapted at their inner edges to receive a transparent medium therebetween, an internally disposed undercut lug for one of said members, a male part for the other member having a side wall adapted to register with said internal lug, said side wall being disposed transversely with respect to the plane of said transparent medium and serving to extend across the parting surface between said frame members, and an indented cleat formed in the male part adapted to interlock with said undercut lug and serving to hold said members in a clamped relation.

11. In a curtain light comprising complementary endless frame members, a set of internally disposed lugs for one of said members, a male part for the other member adapted to nest between said lugs, said male part being disposed transversely with respect to said lugs and extending across the parting surface between said frame members, a curtain fabric interposed between the male part and said lugs, and an indented cleat means serving to interlock the fabric with the frame member and hold said members in a clamped relation.

12. In a curtain light frame, a pane, a cross-sectionally dished or bowed female member provided with a set of inwardly disposed lugs and with an internal flange adapted to bear against the marginal portion of one face of said pane, a second frame member provided with a male part having complementary side walls disposed transversely with respect to the face of the pane and adapted to nest between said lugs, means carried by the second frame member adapted to engage the opposite face of said pane, a curtain fabric interposed between said nested male and female parts and gripped thereby, and indented cleat means interlocking said side walls with said lugs serving to interlace the fabric with said frame members.

13. In a curtain light comprising a pane and complementary frame members therefor, a set of oppositely disposed lugs for one of said members constituting a female part, a male part for the other member adapted to nest between said lugs, said male part being disposed transversely with respect to the face of said pane and extending across the parting surface between said frame members, an internally disposed flange for one of said frame members adapted to bear against the marginal portion of one face of the pane, means carried by the other frame member adapted to engage the opposite face of the pane, and indented cleat means interlocking the male part with the female part.

14. A curtain light frame comprising members for holding a pane, one of which members is provided with a female part and the other with a male part initially shaped to be received within the female part, the male part being expanded or indented within the female part aforesaid when the members are assembled around the pane.

15. A curtain light frame comprising members for holding a pane, one of which members is provided with a female part and the other with a male part initially shaped to be received within the female part, the male part being expanded or indented within the female part aforesaid when the members are assembled about the pane, and a curtain fabric interposed between the nested male and female parts and interlocked thereto by the expansion or indenture of said male part.

16. In a curtain light comprising complementary endless frame members adapted at their inner edges to receive a pane therebetween, an internally disposed lug for one of the members, a male part for the other member having a transversely disposed side wall serving to center the edge of said pane, said wall extending across the parting surface between said frame members and being adapted to register with and nest against said lug, and an indented cleat means formed in the male part serving to interlock with said lug to hold said frame members in a clamped relation about said pane.

In testimony whereof, I have herewith set my hand this 12th day of October, 1923.

WILLIAM K. BISHOP.

Witnesses:
K. H. MOREY,
A. F. GUILFOYLE.